(12) United States Patent
Hayami

(10) Patent No.: US 10,484,564 B2
(45) Date of Patent: Nov. 19, 2019

(54) IMAGE FORMING APPARATUS AND METHOD FOR CONTROLLING THE SAME COMPRISING A STORAGE MEDIUM THAT INDICATES WHETHER THE IMAGE FORMING APPARATUS IS IN A SETTING OF CHECKING A SIGNATURE WHEN AN APPLICATION IS INSTALLED

(71) Applicant: CANON KABUSHIKI KAISHA, Tokyo (JP)

(72) Inventor: Yoshikazu Hayami, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/901,283

(22) Filed: Feb. 21, 2018

(65) Prior Publication Data

US 2018/0241898 A1 Aug. 23, 2018

(30) Foreign Application Priority Data

Feb. 23, 2017 (JP) ................................. 2017-032444
Nov. 16, 2017 (JP) ................................. 2017-221286

(51) Int. Cl.
*G06F 21/00* (2013.01)
*G06F 21/12* (2013.01)
*G06F 21/44* (2013.01)
*H04N 1/00* (2006.01)
*H04N 1/44* (2006.01)

(52) U.S. Cl.
CPC ....... *H04N 1/00938* (2013.01); *H04N 1/0088* (2013.01); *H04N 1/00925* (2013.01); *H04N 1/4433* (2013.01); *H04N 2201/0094* (2013.01)

(58) Field of Classification Search
USPC ....... 358/1.1–3.29, 1.11–1.18; 717/100–127, 717/131, 154, 162–178
See application file for complete search history.

(56) References Cited

U.S. PATENT DOCUMENTS

| 2010/0024016 A1* | 1/2010 | Violleau | G06F 21/335 726/7 |
| 2013/0326500 A1* | 12/2013 | Park | G06F 9/445 717/177 |
| 2014/0090077 A1* | 3/2014 | Jeong | G06F 21/60 726/26 |
| 2014/0282490 A1* | 9/2014 | Shinomiya | G06F 8/61 717/174 |

OTHER PUBLICATIONS

The OSGi Alliance, OSGi Service Platform, Release 4, Aug. 2005, http://www.osgi.org/Download/Release4V40.

* cited by examiner

*Primary Examiner* — Marcellus J Augustin
(74) *Attorney, Agent, or Firm* — Canon U.S.A., Inc. IP Division

(57) ABSTRACT

It is determined whether signature check is set in installation of an application, and it is determined whether a permission included in the application is not a prohibited permission in a case where the signature check is not set. In a case where it is determined that the permission included in the application is not a prohibited permission, installation of the application is allowed.

12 Claims, 16 Drawing Sheets

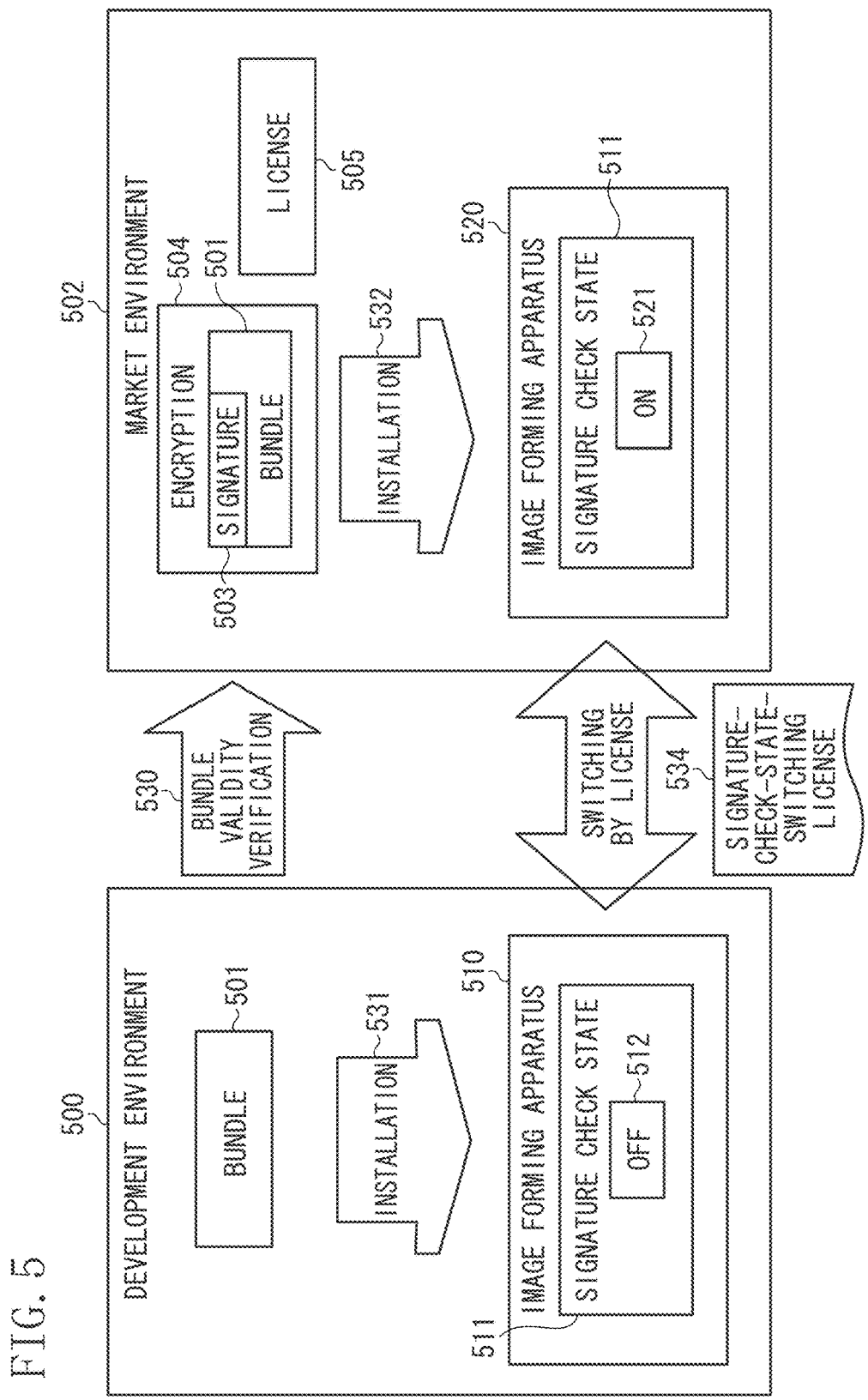

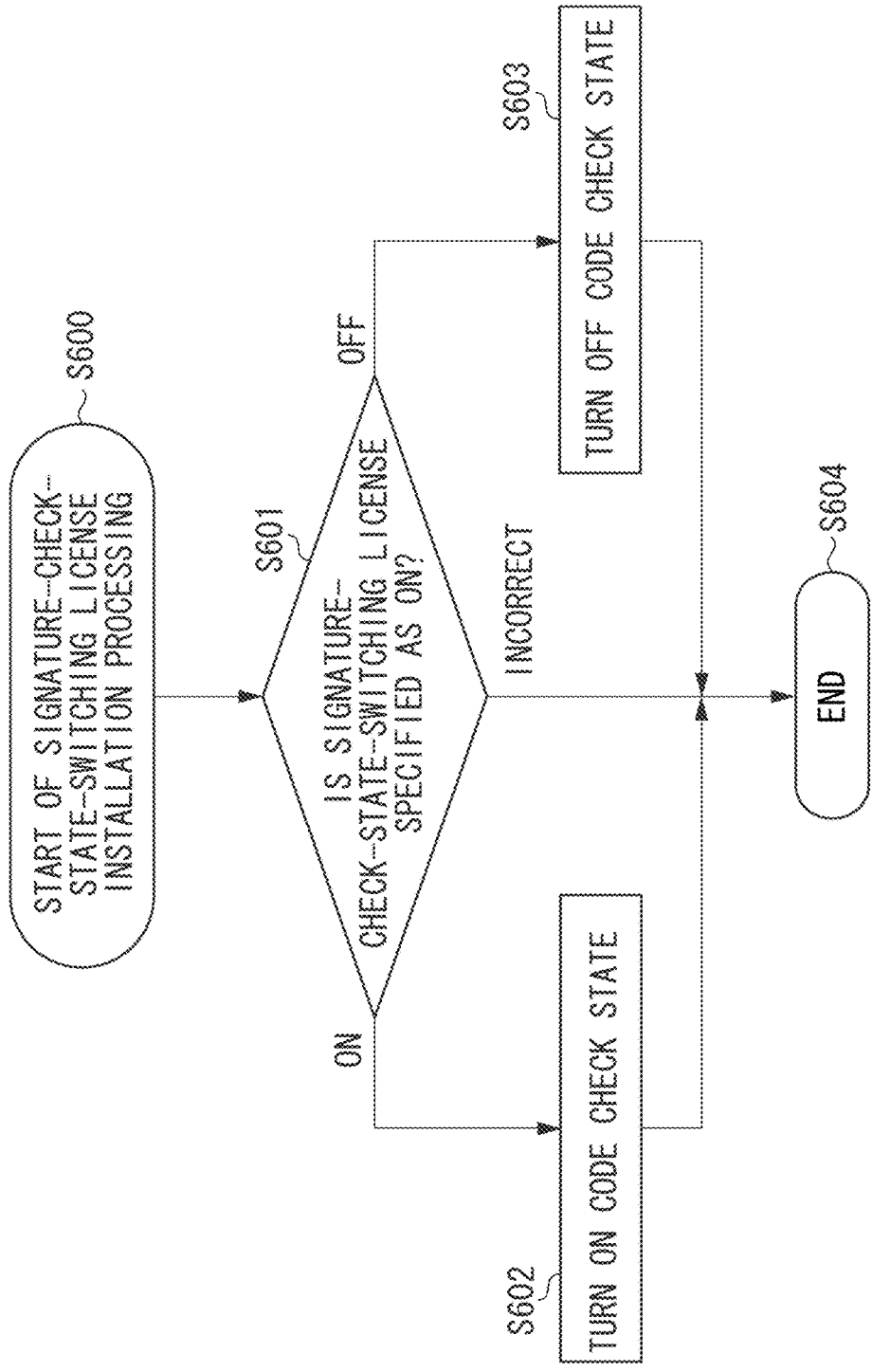

```
PERMISSION DEFINITION FILE (java.lang.RuntimePermission "*" "XXX")
(java.security.SecurityPermission "*" "YYY")
..............................................
```

FIG. 8

```
                          302
      ┌─────────────────────────────────────────────┐
      │ PROHIBITED PERMISSION LIST                  │
 801  │                                             │
      │ blacklist=                                  │
      │ (java.security.AllPermission"*""*")         │
      │ (java.nio.file.LinkPermission"*""*")        │
      │ (java.lang.reflect.ReflectPermission"*""*") │
      │ (java.lang.RuntimePermission"*""xxx")       │
      │ (java.security.SecurityPermission"*""yyy")  │
      │ ............................................│
      └─────────────────────────────────────────────┘
```

FIG. 12

```
EX. 1)
■PROHIBITED PERMISSION
blacklist=
(java.lang.RuntimePermission "loadLibrary.*") (1200)

■PERMISSION HELD BY BUNDLE
(java.lang.RuntimePermission "loadLibrary.xxx.jar") (1201)
⇒HOLDING DETERMINATION OF PROHIBITED PERMISSION (java.lang.RuntimePermission "createClassLoader") (1202)
⇒NON-HOLDING DETERMINATION OF PROHIBITED PERMISSION EX. 2)
■PROHIBITED PERMISSION
blacklist=
(org.osgi.framework.AdminPermission "*" "resource") (1203)

■PERMISSION HELD BY BUNDLE
(org.osgi.framework.AdminPermission "xxx" "resource") (1204)
⇒HOLDING DETERMINATION OF PROHIBITED PERMISSION (org.osgi.framework.AdminPermission "*" "metadata") (1205)
⇒NON-HOLDING DETERMINATION OF PROHIBITED PERMISSION
```

FIG. 13

1300 PROHIBITED PERMISSION

```
blacklist=
(java.security.AllPermission "*" "*")
(java.nio.file.LinkPermission "*" "*")
(java.lang.reflect.ReflectPermission "*" "*")
(java.lang.RuntimePermission "*" "*")
(java.security.SecurityPermission "*" "*")
............................................................
```

1301

PROHIBITED PERMISSION

```
whitelist=
(java.io.FilePermission "/etc/xxx.txt" "read")
(java.io.FilePermission "/log/yyy.log" "read,write,delete")
............................................................
```

EX. 1)
■PROHIBITED PERMISSION
whitelist=
(java.io.FilePermission"/xxx/yyy/zzz/-""read,write,delete") (1500)

■PERMISSION HELD BY BUNDLE
(java.io.FilePermission"≪ALL FILES≫""read,write,delete") (1501)
(java.io.FilePermission"/xxx/yyy/zzz/-""read,write,delete,execute") (1502)
⇒HOLDING DETERMINATION OF PROHIBITED PERMISSION (java.io.FilePermission"/xxx/yyy/zzz/aaa.log""write") (1503)
(java.io.FilePermission"/xxx/yyy/zzz/www""read,write") (1504)
⇒NON-HOLDING DETERMINATION OF PROHIBITED PERMISSION

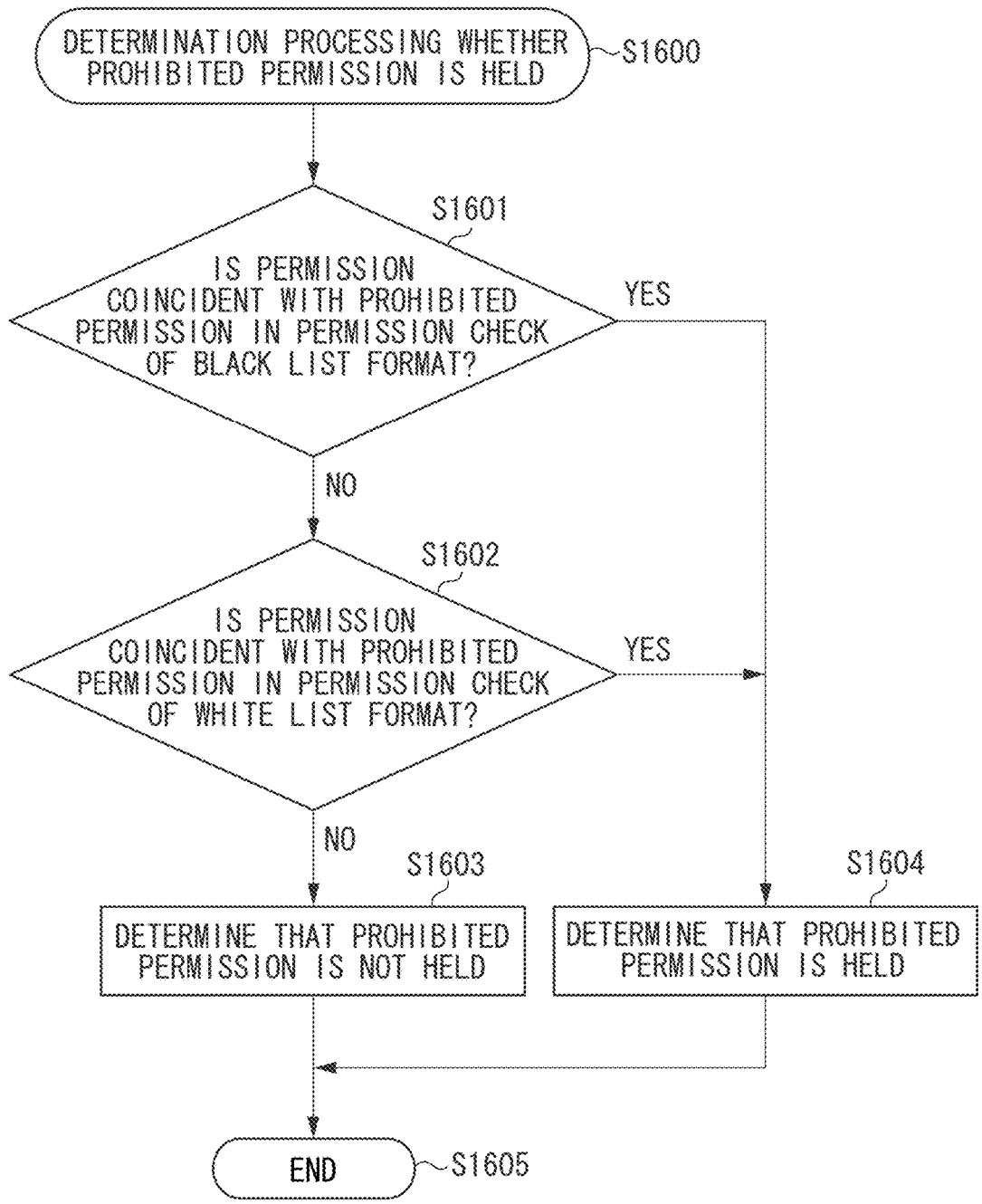

IMAGE FORMING APPARATUS AND METHOD FOR CONTROLLING THE SAME COMPRISING A STORAGE MEDIUM THAT INDICATES WHETHER THE IMAGE FORMING APPARATUS IS IN A SETTING OF CHECKING A SIGNATURE WHEN AN APPLICATION IS INSTALLED

BACKGROUND OF THE INVENTION

Field of the Invention

The present invention relates to installation of an application program.

Description of the Related Art

In recent years, an application operation environment represented by JAVA (registered trademark) environment has been provided to an image forming apparatus. A technology that provides an extensible application with use of program portability of JAVA (registered trademark) has been proposed.

To improve functions and usability of the image forming apparatus, an application that operates in an environment such as the above-described JAVA (registered trademark) environment is created and installed in the image forming apparatus, which achieves desired functions with the application.

Examples of an application platform include an open services gateway initiative (OSGi) service platform (hereinafter, referred to as OSGi). The OSGi is a JAVA (registered trademark) application platform for built-in devices. In the OSGi, a bundle is defined as a management unit of a software module, and specification to manage lifecycle including installation, start, stop, update, and uninstallation is defined. The bundle used herein indicates a JAVA (registered trademark) module, and is synonymous with an application program (hereinafter, abbreviated to "application") in embodiments of the present invention. Thus, the application is written as the bundle below.

In such an application platform, a bundle provides built-in functions, such as copying, scanning, and printing.

Each bundle has a mechanism of security access right that is called permission provided in accordance with a standard specification of JAVA (registered trademark). The permission is individually defined for each bundle.

When the bundle includes a strong permission, such as administrative right, a bundle that adversely affects the image forming apparatus may be created. For example, a bundle holding (java.security.AllPermission) is created as a bundle under development. Installing the bundle in a test-use image forming apparatus in development can allow an access to a system bundle in the image forming apparatus to extract internal information of the system bundle.

SUMMARY OF THE INVENTION

Embodiments of the present invention are directed to a technology for installing applications, including an application under development, while securing safety of an image forming apparatus.

According to embodiments of the present invention, an image forming apparatus includes a first determination unit configured to determine whether signature check is set in installation of an application, a second determination unit configured to determine whether a permission included in the application is not a prohibited permission in a case where the first determination unit determines that the signature check is not set, and a unit configured to allow installation of the application in a case where the second determination unit determines that the permission included in the application is not a prohibited permission.

Further features of the present invention will become apparent from the following description of exemplary embodiments with reference to the attached drawings.

BRIEF DESCRIPTION OF THE DRAWINGS

FIG. 5 is a block diagram to explain a state until the bundle is released and a state of the corresponding image forming apparatus.

FIG. 6 is a flowchart of installation of signature-check-state-switching license by a bundle management service.

FIG. 8 is a diagram illustrating an example of a prohibited permission list.

FIG. 12 is a diagram illustrating a method for determining whether a permission held by the bundle is included in the prohibited permissions.

FIG. 13 is a block diagram illustrating prohibited permissions in a white list format.

FIG. 15 is a diagram illustrating a method for determining whether a permission held by the bundle is included in the prohibited permissions in the white list format.

FIG. 16 is a flowchart when the OSGi extension unit performs the prohibited permission holding determination for the prohibited permissions that are defined in both of a black list format and the white list format.

DESCRIPTION OF THE EMBODIMENTS

Exemplary embodiments of the present invention are described below with reference to drawings.

Figure 1:
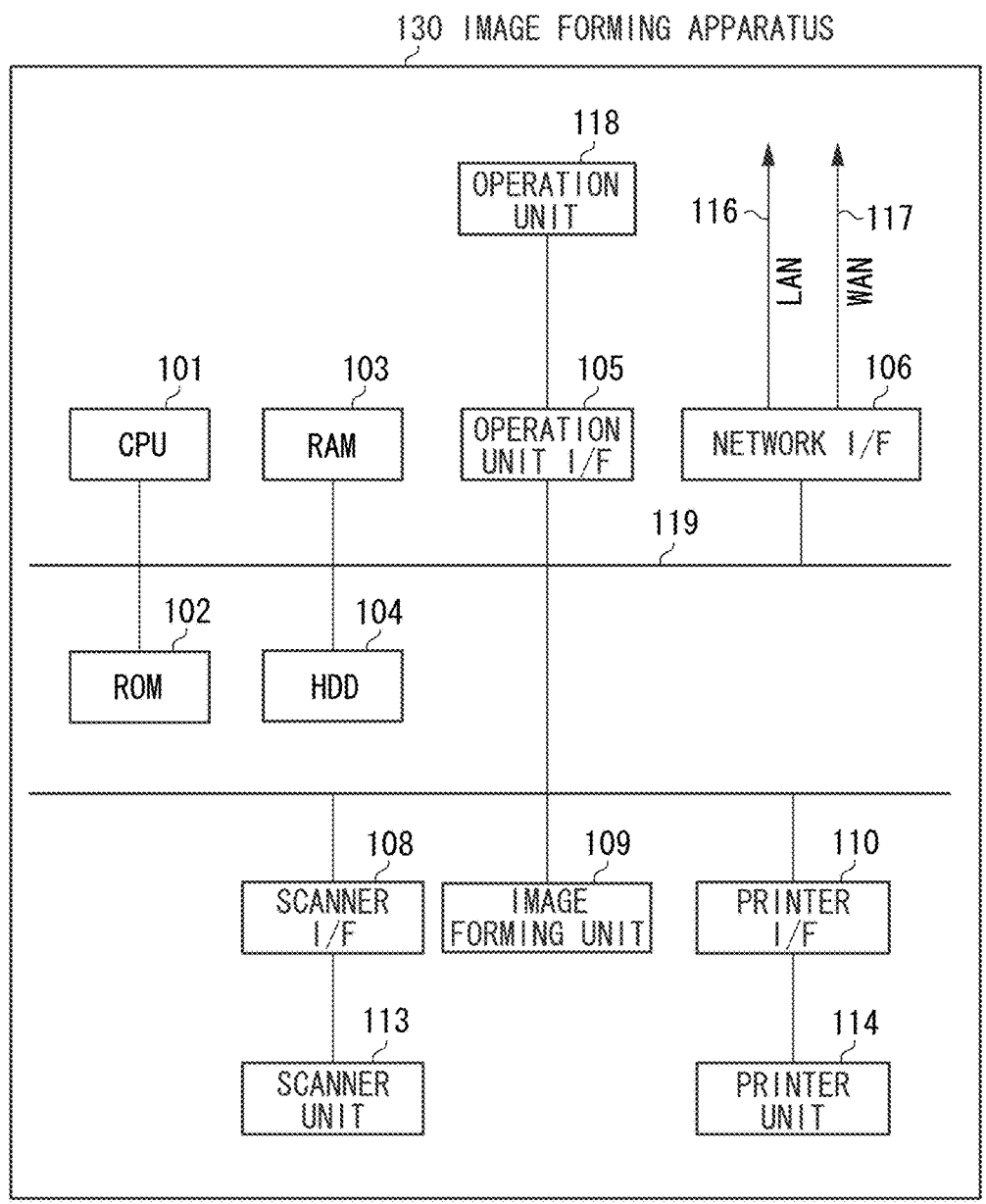
FIG. 1 is a diagram illustrating a hardware configuration of an image forming apparatus.

A first exemplary embodiment of the present invention will be described below. FIG. 1 is a diagram illustrating a hardware configuration of an image forming apparatus 130 that includes a print function, a scan function, a network communication function, and other functions.

The image forming apparatus 130 is electrically connected to a scanner unit 113 and a printer unit 114, and is connected to an external device through a local area network (LAN) 116.

A central processing unit (CPU) 101 controls access to connected various hardware devices in a centralized manner based on a control program, etc. held by a read only memory (ROM) 102, and controls various types of processing to be executed inside a controller in a centralized manner.

The ROM 102 is a read-only nonvolatile storage region, and holds a boot program, a firmware, etc. of the image forming apparatus 130.

A random access memory (RAM) 103 is a system work memory for operation of the CPU 101, and temporarily holds various types of data. The RAM 103 includes, for example, Ferroelectric Random Access Memory (FRAM, registered trademark) and a static random access memory (SRAM) that can hold the stored contents after power off, and a dynamic random access memory (DRAM) from which the stored contents are erased after power off.

Figure 3:
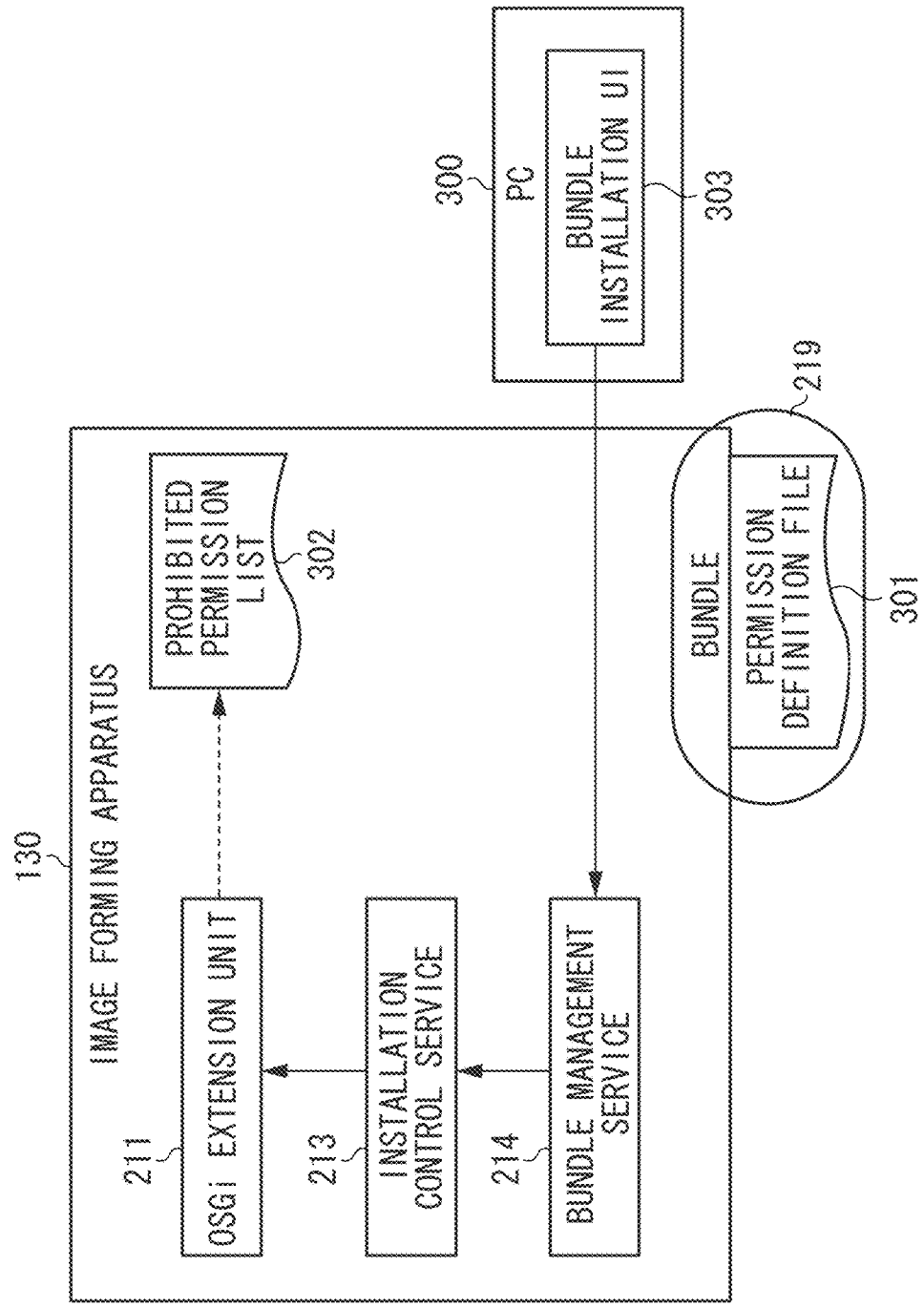
FIG. 3 is a block diagram illustrating a flow in which a bundle is installed.

A hard disk drive (HDD) 104 is a nonvolatile storage region, and holds a system bundle, etc. A firmware including a bundle to be installed, described in FIG. 3 is stored in the HDD 104.

An operation unit interface (I/F) 105 connects a system bus 119 and an operation unit 118. More specifically, the operation unit I/F 105 receives, from the system bus 119, data to be displayed on the operation unit 118 and displays the data on the operation unit 118, and outputs information input through the operation unit 118 to the system bus 119. A user instruction and information presentation to the image forming apparatus 130 are performed through the operation unit 118.

A network I/F 106 is connected to the LAN 116, a wide area network (WAN) 117, and the system bus 119, and performs input/output of information from/to outside.

A scanner I/F 108 performs correction, processing, and editing on image data received from the scanner unit 113.

An image forming unit 109 performs direction conversion, image compression, image decompression, etc. on the image data.

A printer I/F 110 receives the image data transmitted from the image forming unit 109, forms an image, and prints the image with the printer unit 114.

Figure 2:
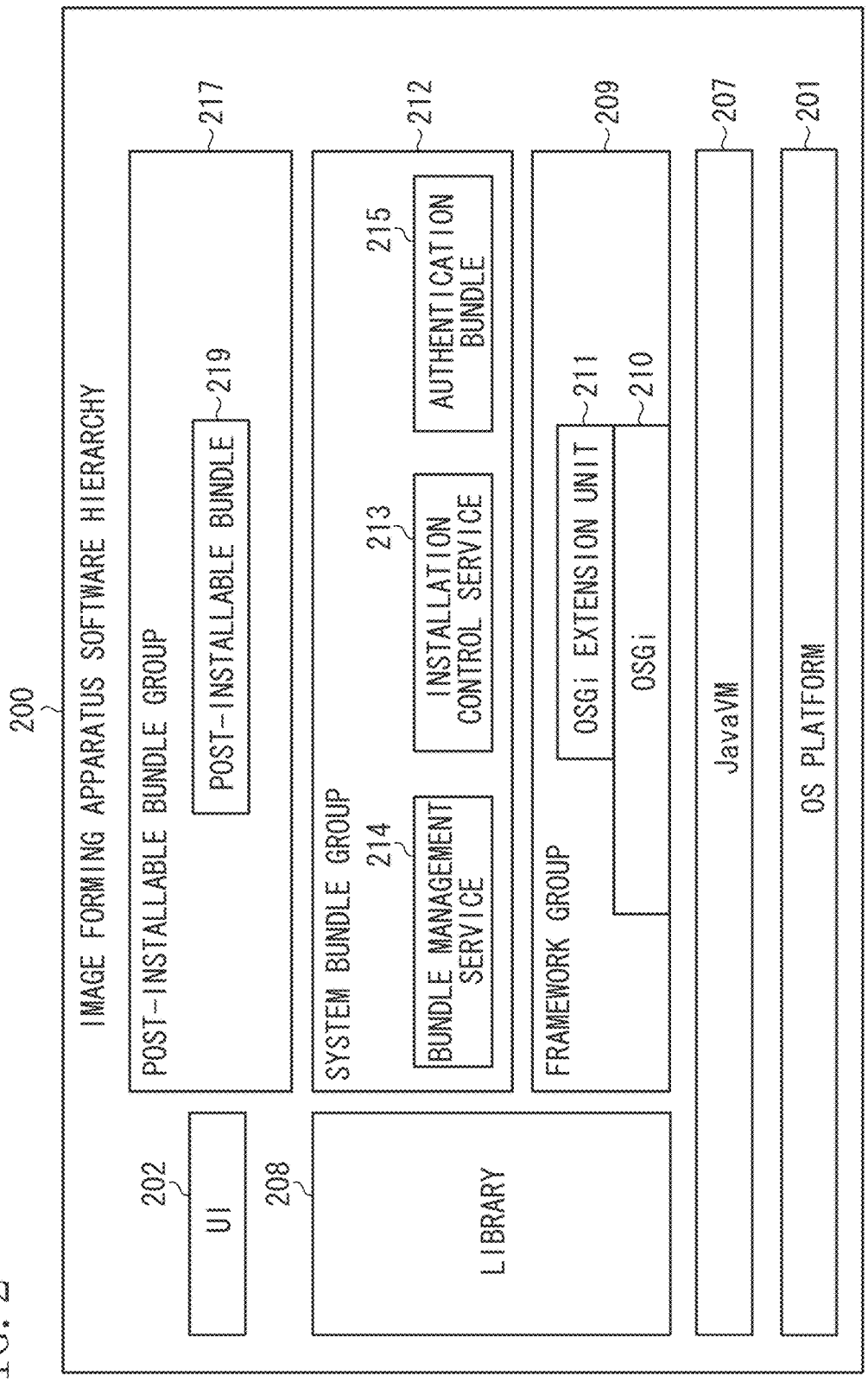
FIG. 2 is a diagram illustrating software module hierarchy of the image forming apparatus.

FIG. 2 is a diagram illustrating software module hierarchy of the image forming apparatus 130 according to the present exemplary embodiment. Each piece of software illustrated in FIG. 2 and subsequent drawings is held by the ROM 102 or the HDD 104, and is executed by the CPU 101. Various types of information to be used in execution is held by the RAM 103 or the HDD 104, and is exchanged between software functions. Moreover, communication with external apparatuses is performed with use of the network I/F 106.

Next, each piece of the software will be described. The software includes an operating system (OS) platform 201.

A user interface module (UI) 202 mediates the image forming apparatus 130 and user operation when an operator performs various operations and setting to the image forming apparatus 130. The module transfers input information to various modules described below, and requests processing or performs data setting change, etc., in accordance with the operation of the operator.

Next, a configuration on JAVA (registered trademark) side is described.

A software platform on Java (registered trademark) side is configured as a runtime environment of Java virtual machine (VM) 207, and includes the Java VM 207 as an interpreter, a library 208, and a framework group 209. The library 208 includes a standard application programming interface (API) library. The framework group 209 includes an Open Services Gateway initiative service platform (OSGi) 210, and the OSGi 210 causes a single Java VM 207 to operate a plurality of bundles. An OSGi extension unit 211 is a module that takes an implementation part to the OSGi 210 being an interface specification. The OSGi extension unit 211 indicates that a function is extensible within a range satisfying the specification of the OSGi 210 as necessary. The OSGi 210 and the OSGi extension unit 211 provide management of a bundle lifecycle, an inter-bundle communication function, etc.

A plurality of system bundle groups 212 are provided above the OSGi 210. Examples of the system bundle group 212 include a bundle management service 214 that manages a plurality of bundles, and adds, updates, and deletes a new bundle. The bundle management service 214 is a receiver that receives an installation instruction from a personal computer (PC). The bundle management service 214 that has received the installation instruction uses an installation control service 213 to add and update the bundle.

The system bundle group 212 further includes an authentication bundle 215 taking on an authentication function of the image forming apparatus 130. The authentication bundle 215 has an unstoppable property because the authentication bundle 215 receives inquiry of authentication information from an optional bundle at optional timing during the authentication of the user to the image forming apparatus.

A post-installable bundle group 217 that is to be installed afterward is provided. Installation of the bundle is illustrated in FIG. 3. As the post-installable bundle group 217, a post-installable bundle 219 provides various types of processing in the image forming apparatus 130 to the user. For example, there are a bundle that performs processing and compression of an image, and a bundle that performs department management, such as print restriction.

The post-installable bundle 219, which implements various functions, is operated under management of the bundle management service 214. The bundle management service 214 holds bundle information including a version of the bundle added under management, license information, etc.

FIG. 3 is a block diagram illustrating a flow in which the post-installable bundle 219 is installed from a PC 300 to the image forming apparatus 130.

The post-installable bundle 219 on the market has been provided with a digital signature and encrypted for falsification prevention, as illustrated in FIG. 5. The post-installable bundle 219 includes a permission definition file 301. The permission definition file 301 indicates a permission usable by the post-installable bundle 219 when various functions are used after installation. The permission used herein indicates a mechanism of security access right provided according to a standard specification of Java (registered trademark). The permission definition file 301 may not be held if it is unnecessary. The permission is normally defined in a form of a permission name, "name", and "action" as described below. A possible value of each "name" and "action" varies depending on the permission type. The possible value may be specified with a wildcard using a symbol "*". (XXXPermission, "name", "action")

A bundle installation UI 303 is displayed on a web browser of the PC 300, the bundle 219 to be installed is specified on the bundle installation UI 303, and the bundle 219 is installed. The bundle management service 214 that has received the bundle specified on the bundle installation UI 303 provides the bundle to the installation control service 213. The installation control service 213 that has received the bundle file performs decryption processing for the received bundle 219 and check processing for checking whether the received bundle 219 has been provided with a digital signature indicating validity. In a case where there is no problem in the checking, the installation control service 213 finally requests the OSGi extension unit 211 to perform installation. A prohibited permission list 302 illustrated in FIG. 7 is held by the HDD 104. In a case where the image forming apparatus 130 described below is in a state where a digital signature check is OFF, the OSGi extension unit 211 refers to the prohibited permission list 302, and check whether the permission provided with the bundle 219 includes the prohibited permission. The OSGi extension unit 211 then performs installation. It is presumably appropriate that the prohibited permission check be performed by the OSGi extension unit 211 because management of the permissions is included in the regulation of the OSGi 210 and the OSGi extension unit 211 performs final bundle installation processing. The installed bundle is managed by the bundle management service 214.

Figure 4:
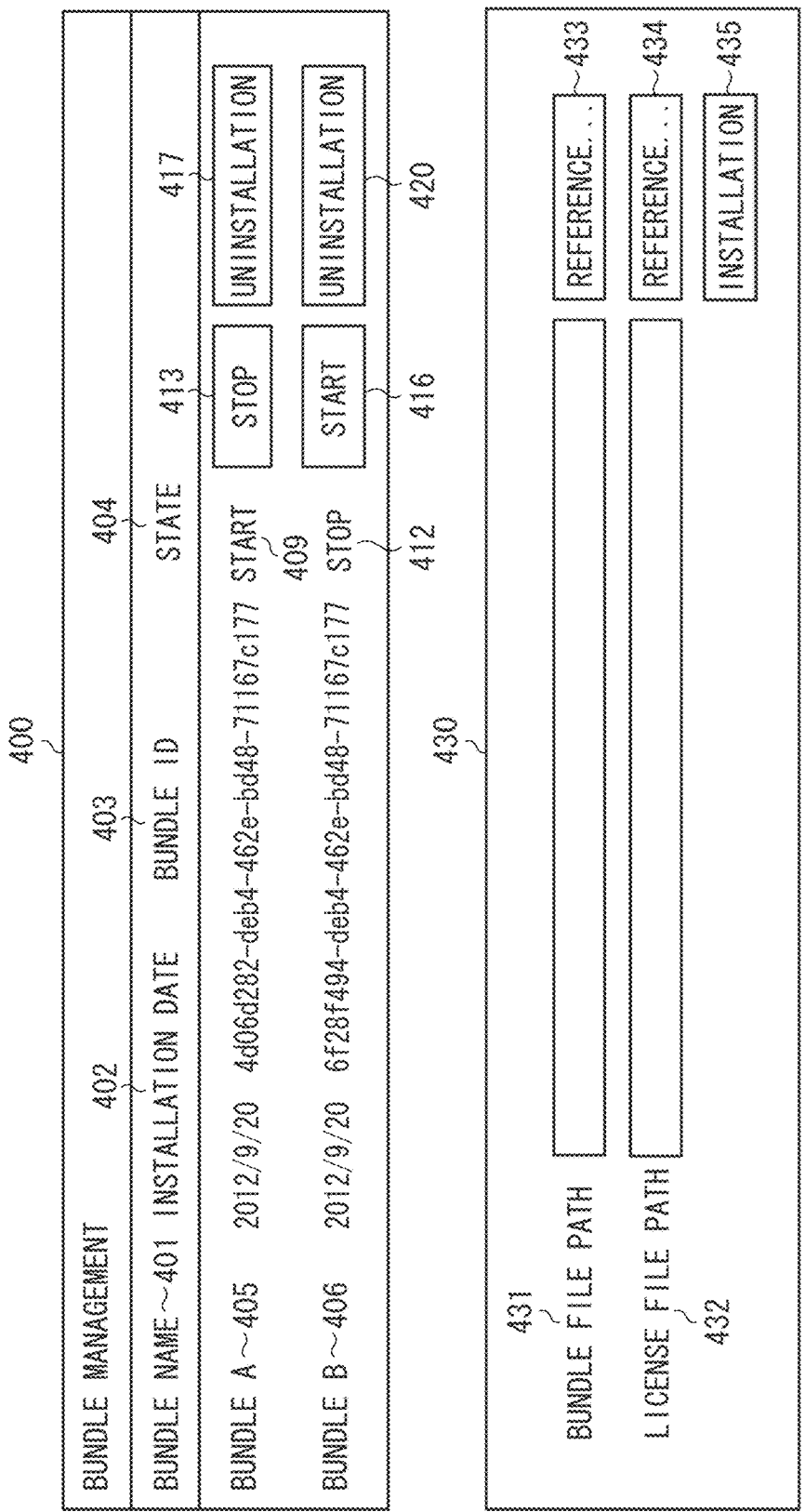
FIG. 4 is a diagram illustrating a user interface (UI) of each of a bundle management screen and an installation screen.

FIG. 4 illustrates a bundle management screen 400 and an installation screen 430 on the bundle installation UI 303.

A bundle name 401 displays a managed bundle name. In this example, two of bundle A 405 and bundle B 406 are managed. An installation date 402 indicates a date on which each of the bundles has been installed. A bundle ID 403 displays a bundle ID that is uniquely assigned to each of the bundles. A state 404 indicates a state of each of the bundles. When the bundle has been started, start 409 is displayed on the state 404, and when the bundle has been stopped, stop 412 is displayed on the state 404. A start button 416 and a stop button 413 are instruction buttons to switch the bundle between start and stop. The stop button is displayed in the case of the bundle in the started state, and the start button is displayed in the case of the bundle in the stopped state. When the stop button 413 for the bundle in the started state is pressed (in this example, "bundle A 405"), the state 404 is changed to "stop". In contrast, when the start button 416 for the bundle in the stopped state (in this example, "bundle B 406") is pressed, the state 404 is changed to "start". Uninstallation buttons 417 and 420 are uninstallation instruction buttons for the respective bundles.

Next, the installation screen 430 is described. A reference button 433 is to display a screen for selection of a file path. When the bundle file is specified on the screen, a path to the bundle file is input in the bundle file path 431. The bundle may require a license file for decryption of the bundle in installation processing in some cases, in terms of security and business. When a reference button 434 is pressed in such a case, a screen for selection of the file path is displayed. When the license file is specified as with the bundle specification, a path to the license file is input in a license file path 432. When an installation button 435 is pressed, installation of the bundle specified by the bundle file path 431 is started.

FIG. 5 is a block diagram illustrating a state until the bundle is released and a state of the corresponding image forming apparatus.

A state of a bundle 501 under development and a state of an image forming apparatus 510 are illustrated in a development environment 500. Unlike a market environment described below, in the development environment 500, development before verification is ongoing, and it is possible for a developer to freely give permission.

The bundle 501 is under development, and is not accordingly provided with a digital signature indicating validity of the bundle. To that end, in a case where installation 531 of the bundle 501 to the image forming apparatus 510 is performed and operation check is then performed, the signature check state of the image forming apparatus 510 is necessary to be OFF 511. Here, the signature check is to check whether the legitimate signature is provided to the bundle at the time of the bundle installation. In a case where the bundle does not include the legitimate signature as a result of the check, the bundle installation fails. The OFF 512 of the signature check state 511 indicates a state where the signature check is not performed.

A state of each of an encrypted bundle 504 and an image forming apparatus 520 that have been released on the market is illustrated in the market environment 502. In the market environment 502, bundle validity verification is performed before release of the developed bundle onto the market. A digital signature for certification of the validity is provided to the verified bundle having been subjected to the verification. Only the bundle certified in validity is allowed to be installed through the signature check which is always performed when the bundle is installed in the image forming apparatus.

To release the developed bundle 501 onto the market, bundle validity verification 530 is necessary. In the bundle validity verification 530, verification whether an appropriate permission has been provided to the bundle is performed, in addition to the verification whether the resource to be used by the bundle is within a normal range. A digital signature 503 is provided to the bundle 501, the validity of which has been verified. Encryption 504 is then performed to secure security. A corresponding license 505 is necessary in order to hold information of a key for decryption.

The signature check state 511 of the image forming apparatus 520 in the market environment 502 is necessary to be ON 521. This prevents the bundle 501 without a signature under development from being installed in the image forming apparatus 520 on the market. In contrast, the released encrypted bundle 504 with the signature 503 is installable in the image forming apparatus 520 when being subjected to installation 532 with the license 505.

As described above, since the signature check state of the image forming apparatus is an important setting, the mechanism that prevents the signature check state from being easily switched on the market is necessary. To that end, the signature check state of the image forming apparatus is switchable only by using a dedicated signature-check-state-switching license 534 for change of the signature check state. Moreover, ON/OFF information about the signature check state 511 is held by the HDD 104.

FIG. 6 is a flowchart illustrating installation of the signature-check-state-switching license 534. The signature-check-state-switching license 534 is installed from the PC 300 to the bundle management service 214 through a license installation UI (not illustrated).

In step S600, the bundle management service 214 starts installation processing of the received signature-check-state-switching license 534.

In step S601, it is determined whether the received signature-check-state-switching license 534 is specified as ON. In a case of being specified as ON (ON in step S601), the processing proceeds to step S602. In a case of being specified as OFF (OFF in step S601), the processing proceeds to step S603. In a case where the specified license is in an incorrect state (incorrect in step S601), the processing proceeds to step S604. The incorrect state indicates a state where the format is incorrect, etc.

In step S602, the code check state 511 is set to ON. In step S603, the code check state 511 is set to OFF. In step S604, the installation processing of the signature-check-state-switching license 534 ends.

Figures 7A, 7B:
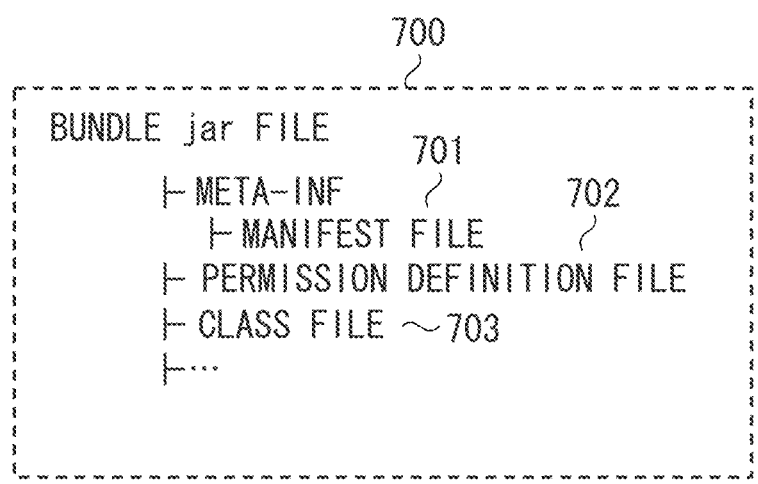
FIGS. 7A and 7B are diagrams each illustrating an internal structure of the bundle.

FIG. 7A illustrates an internal structure of the bundle. A bundle jar file 700 includes not only a manifest file 701 and a class file 703 as an entity of the bundle but also a permission definition file 702. FIG. 7B illustrates an example of the permission definition file 702. Permissions described in the permission definition file 702 are usable by the bundle jar file 700.

FIG. 8 illustrates an example of the prohibited permission list 302. The prohibited permission list 302 is a list of permissions 801 that lead to unauthorized use, such as acquisition of system bundle information of the image forming apparatus, when the bundle holds these permissions and creates programs as appropriate. These permissions are listed in a black list format to define the permissions, holding of which is prohibited for the bundle.

Figure 9:
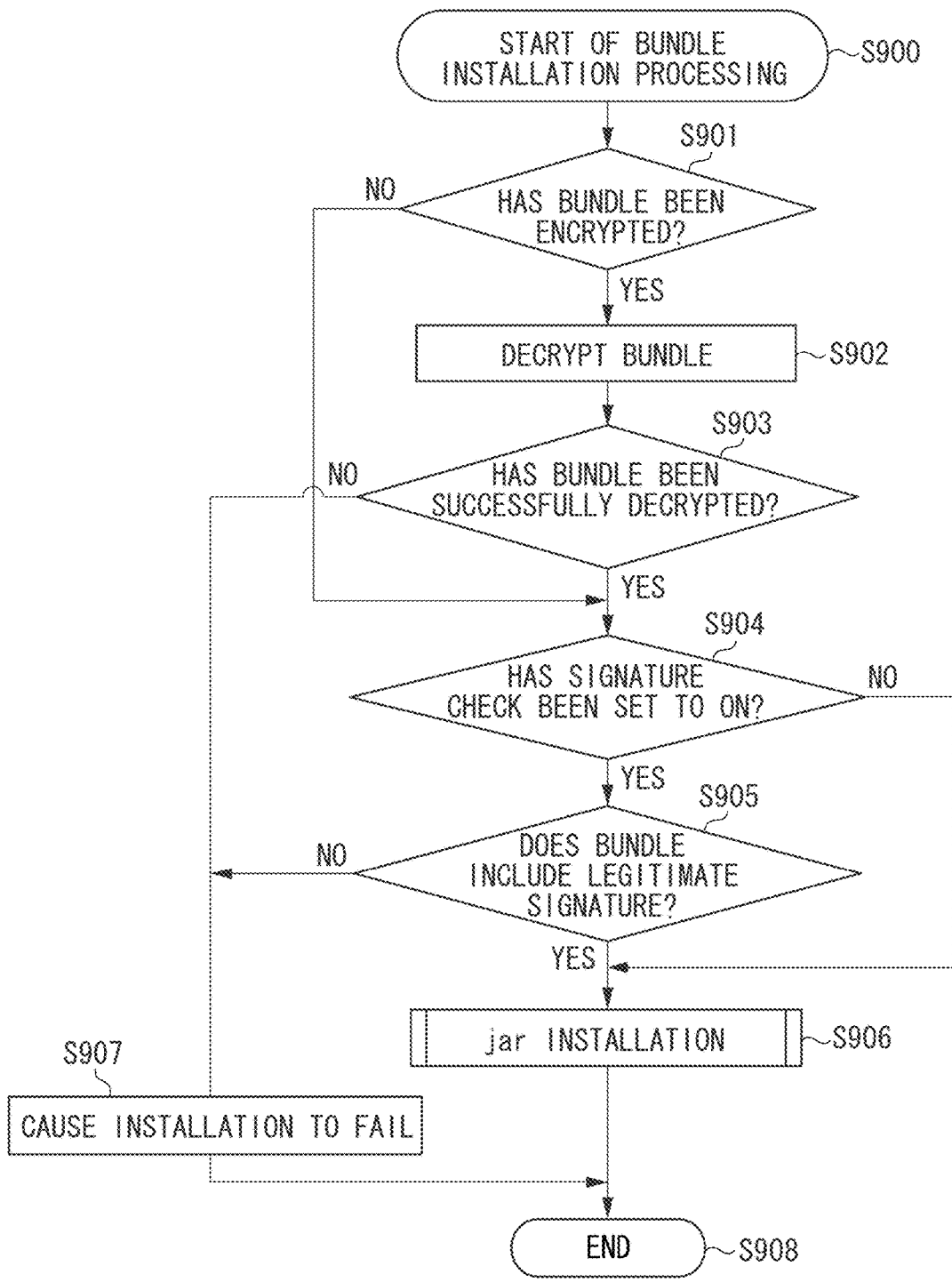
FIG. 9 is a flowchart of operation to be performed by an installation control service when the bundle is installed in the image forming apparatus.

FIG. 9 is a flowchart illustrating operation performed by the installation control service 213 when the bundle is installed in the image forming apparatus.

In step S900, the installation control service 213 that has received the specified bundle from the bundle management service 214 starts the bundle installation processing.

In step S901, it is determined whether the specified bundle has been encrypted. In a case where the specified bundle has been encrypted (YES in step S901), the processing proceeds to step S902. In a case where the specified bundle has not been encrypted (NO in step S901), the processing proceeds to step S904. At this time, it is supposed that the encrypted bundle is in a state of the bundle 504 on the market, and the non-encrypted bundle is in a state of the bundle 501 under development.

In step S902, in a case of the encrypted bundle, the encrypted bundle is decrypted with use of a key for bundle decryption that is provided to the license specified together.

In step S903, it is determined whether the bundle has been successfully decrypted. In a case where the decryption fails (NO in step S903), the processing proceeds to step S907 and execution of the installation fails. Incorrect combination of the bundle and the license is assumed to be a failure factor. In a case where the bundle has been successfully decrypted in step S903 (YES in step S903), the processing proceeds to step S904. In step S904, the signature check state of the device is determined. In a case where the signature check has been set to ON in step S904 (YES in step S904), the processing proceeds to step S905. In a case where the signature check has been set to OFF (NO in step S904), the processing proceeds to step S906.

In step S905, it is determined whether the signature 503 provided to the bundle is legitimate. In a case where the signature 503 has been determined as a legitimate signature in step S905 (YES in step S905), the processing proceeds to step S906. In a case where the signature 503 has not been determined as the legitimate signature (NO in step S905), the processing proceeds to step S907 and execution of the installation fails. In other words, propriety of installation is determined based on whether the legitimate signature is provided. In step S906, the bundle is passed to the installation processing of the OSGi extension unit 211 illustrated in FIG. 9. In step S908, the installation processing of the installation control service 213 ends.

Figure 10:
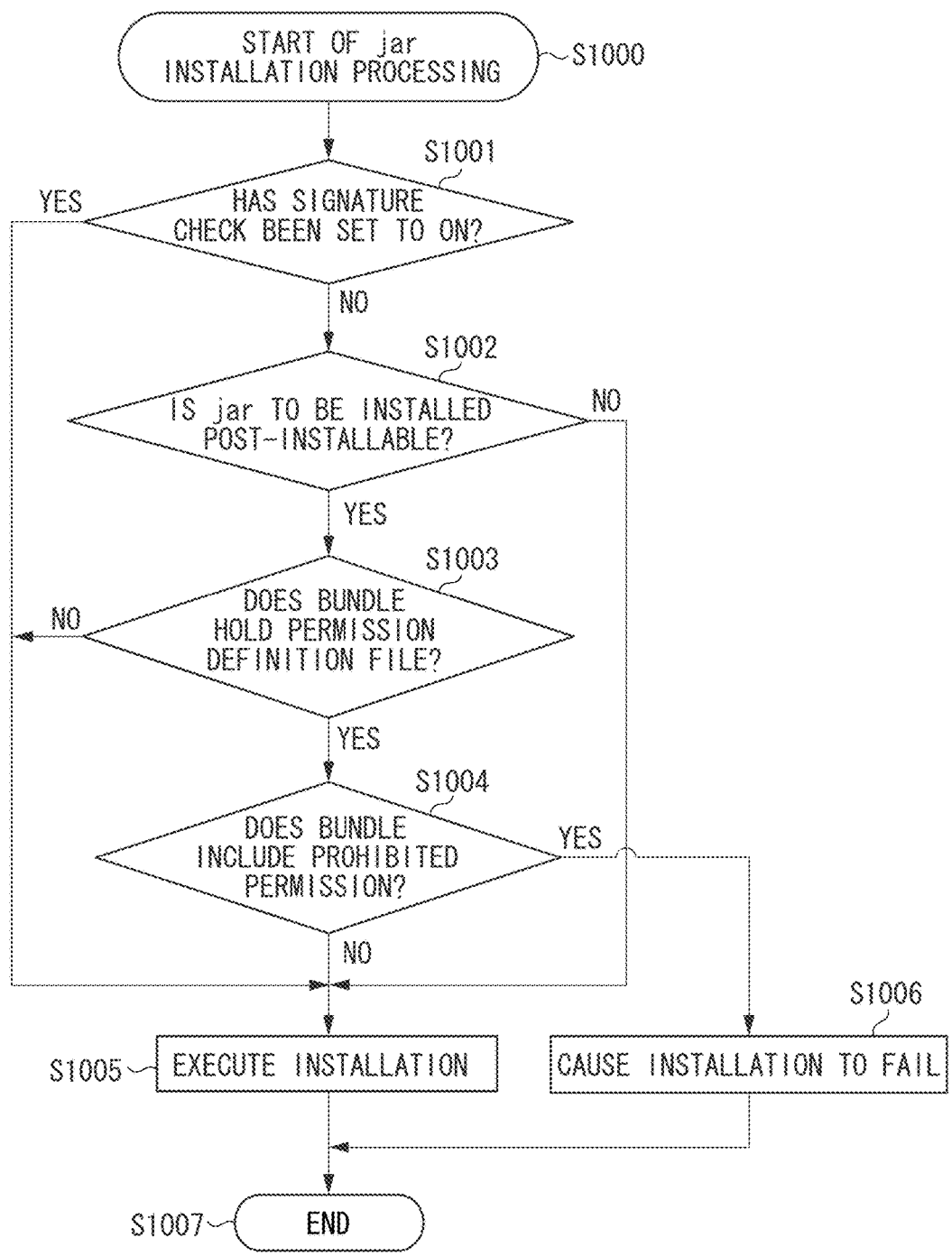
FIG. 10 is a flowchart of operation to be performed by an OSGi extension unit in bundle installation.

FIG. 10 is a flowchart illustrating operation performed by the OSGi extension unit 211 at the time when a jar is received from the installation control service 213 in step S906 in the bundle installation.

In step S1000, the OSGi extension unit 211 starts the bundle installation processing. In step S1001, the signature check state of the device is determined. In a case where the signature check has been set to ON in step S1001 (YES in step S1001), the processing proceeds to step S1005. In a case where the signature check has been set to OFF (NO in step S1001), the processing proceeds to step S1002.

In step S1002, it is determined whether the jar to be installed is a post-installable bundle as illustrated in FIG. 3. Here, the bundle not post-installable is the system bundle group 212 that is pre-installed in the image forming apparatus 130. In a case where the bundle is determined as being not post-installable in step S1002 (NO in step S1002), the processing proceeds to step S1005 and the check of the prohibited permission is omitted. This is because the system bundle group 212 has a function requiring a strong permission such as a prohibited permission and is regarded to be secured in safety because of pre-installation. In a case where the bundle is determined as being post-installable (YES in step S1002), the processing proceeds to step S1003. In step S1003, it is determined whether the bundle holds the permission definition file. In a case where the bundle does not hold the permission definition file (NO in step S1003), the processing proceeds to step S1005. In a case where the bundle holds the permission definition file (YES in step S1003), the processing proceeds to step S1004.

Figure 11:
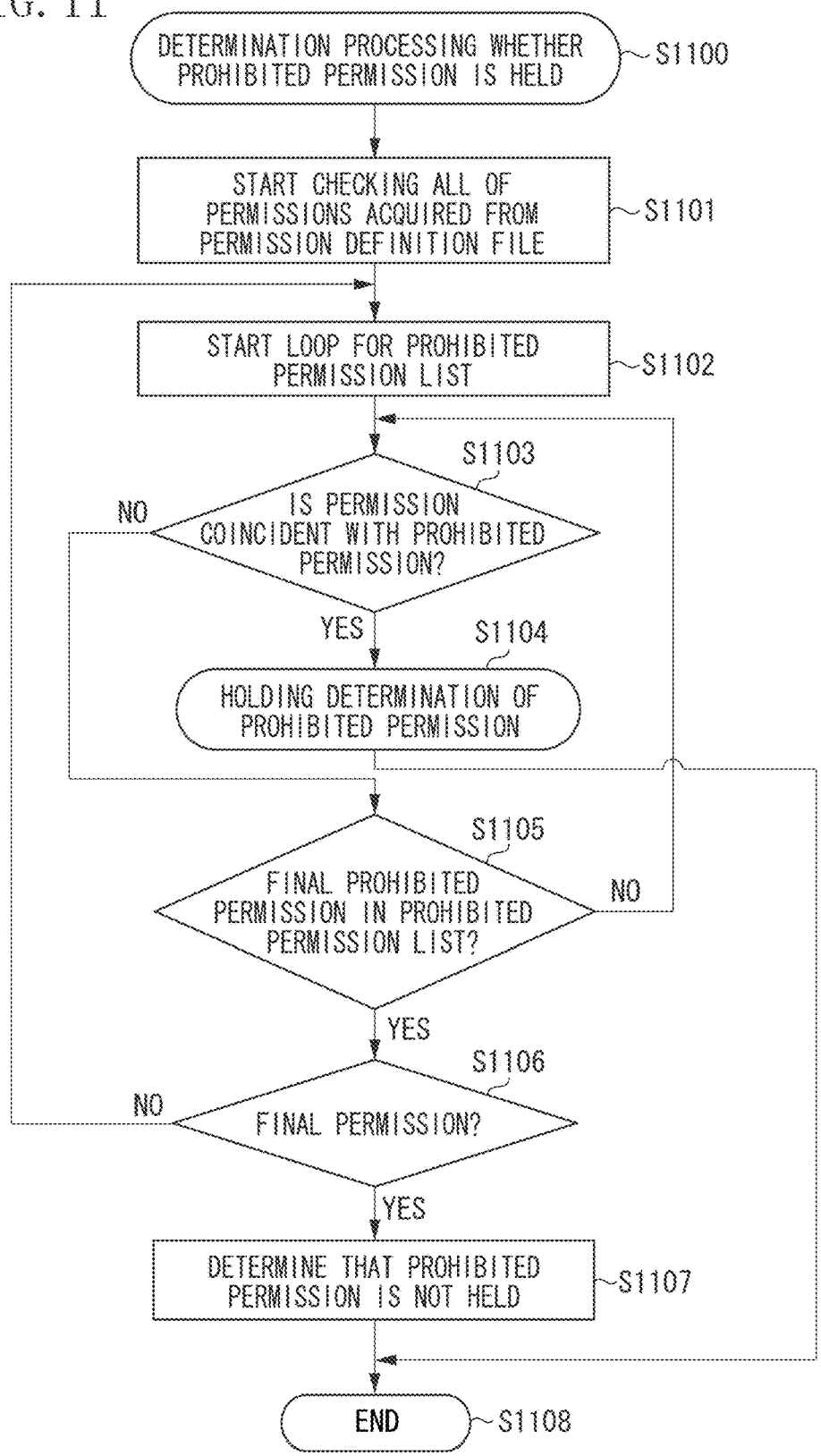
FIG. 11 is a flowchart of prohibited permission determination to be performed by the OSGi extension unit.

In step S1004, it is determined whether the permission held by the bundle includes the prohibited permission. The determination method is illustrated in FIG. 11. In a case where it is determined that the permission does not include the prohibited permission in step S1004 (NO in step S1004), the processing proceeds to step S1005. In a case where it is determined that the permission includes the prohibited permission (YES in step S1004), the processing proceeds to step S1006 and execution of installation fails. In step S1005, the jar is copied to an installation folder and the installation of the bundle is completed. In step S1007, the bundle installation processing of the OSGi extension unit 211 ends.

FIG. 11 is a flowchart illustrating the prohibited permission determination processing performed by the OSGi extension unit 211.

In step S1100, determination processing whether the permission held by the bundle includes the prohibited permission is started.

In step S1101, checking all of the permissions held by the bundle is started. The following check is performed to all of the permissions held by the bundle.

In step S1102, loop is started for all of the permissions described in the prohibited permission list 302.

In step S1103, it is determined whether the first permission described in the prohibited permission list 302 is coincident with the first permission held by the bundle. A specific method for determining the coincidence is described in FIG. 12. In a case where it is determined that the first permission described in the prohibited permission list 302 is coincident with the first permission held by the bundle (YES in step S1103), the processing proceeds to step S1104. In step S1104, it is determined that the prohibited permission is held. Thereafter, the determination processing ends in step S1108. In such a case, "YES" is returned as a determination result of step S1004. In a case where it is determined that the first permission described in the prohibited permission list 302 is not coincident with the first permission held by the bundle in step S1103 (NO in step S1103), the processing proceeds to step S1105.

In step S1105, it is determined whether the prohibited permission is a final prohibited permission. In a case where unchecked prohibited permission exists (NO in step S1105), the processing returns to step S1103, and determination processing for next prohibited permission is continuously repeated. After all of the prohibited permissions are completely checked, the processing proceeds to step S1106.

In step S1106, it is determined whether the permission is a final permission held by the bundle. In a case where unchecked permission exists (NO in step S1106), the processing returns to step S1102, and the determination processing is continuously repeated for next permission held by the bundle. After all of the permissions held by the bundle are completely checked, the processing proceeds to step S1107.

In step S1107, it is determined that the prohibited permission is not held, and the determination processing ends in step S1108. In this case, "NO" is returned as a determination result of step S1004.

FIG. 12 illustrates a method for determining whether a permission held by the bundle is included in the prohibited permissions.

A case of a prohibited permission (1200) is described as an example 1. The prohibited permission (1200) is (java.lang.RuntimePermission) as a permission, and "loadLibrary.*" is specified as "name". The symbol "*" indicates a wildcard.

In a case where the permission held by the bundle is (java.lang.RuntimePermission"loadLibrary.xxx.jar") (1201), the permission held by the bundle and the prohibited permission are coincident with each other in the permission and "name". Thus, it is determined that the prohibited permission is held. In a case where the permission held by the bundle is (java.lang.RuntimePermission"createClassLoader") (1202), both are coincident with each other in the permission but are not coincident with each other in "name". Thus, it is determined that the prohibited permission is not held.

A case of a prohibited permission (1203) is described as an example 2.

The prohibited permission (1203) is (org.osgi.framework.AdminPermission) as a permission, and the symbol "*" is specified as "name," and "resource" is specified as "action". The symbol "*" indicates the wildcard.

In a case where the permission held by the bundle is (org.osgi.framework.AdminPermission"xxx" "resource") (1204), the permission held by the bundle and the prohibited permission are coincident with each other in all of the permission, "name", and "action". Thus, it is determined that the prohibited permission is held. In a case where the permission held by the bundle is (org.osgi.framework.AdminPermission"*" "metadata") (1205), both are coincident with each other in the permission and "name" but are not coincident with each other in "action". Thus, it is determined that the prohibited permission is not held.

FIG. 11 is a flowchart to determine whether the bundle to be installed includes the prohibited permission; however, the determination method is merely an example. In other words, the determination may not be performed in accordance with the flowchart of FIG. 11, and it is sufficient to determine whether the permission of the permission definition file of the bundle to be installed includes the permission included in the prohibited permission list illustrated in FIG. 8. In a case where the permission of the permission definition file of the bundle to be installed does not include the permission included in the prohibited permission list illustrated in FIG. 8, it is determined that the prohibited permission is not held. In a case where it is determined that the prohibited permission is not held, installation is executed.

A first modification of the first exemplary embodiment will be described below. In the first modification, a method for defining, not the prohibited permissions defined in the black list format illustrated in FIG. 8 of the first exemplary embodiment, but the prohibited permissions defined in a white list format is described.

FIG. 13 is a block diagram illustrating the prohibited permissions defined in the white list format. A reference numeral 1300 denotes the prohibited permission definition in the black list format illustrated in FIG. 8. In other words, the shaded permissions illustrated here are all prohibited permissions.

In contrast, a description will be provided of definition of (java.io.FilePermission), specification of the prohibited permission of which is difficult in the black list format.

A reference numeral 1301 denotes prohibited permissions of (java.io.FilePermission). In "FilePermission", a path of an objective file is specified by "name", and an operation form to the objective file is specified by "action".

Assume that "FilePermission" is to be partially allowed and others are to be prohibited. The prohibited permissions cannot be defined in the black list format because there are paths of the objective files to be prohibited without number. To that end, as illustrated by a reference numeral 1302, objective files to be allowed are defined and "FilePermission" other than the allowed objective files are defined as the prohibited permissions. As described above, "FilePermission" becomes prohibited permission definition in the white list format.

Figure 14:
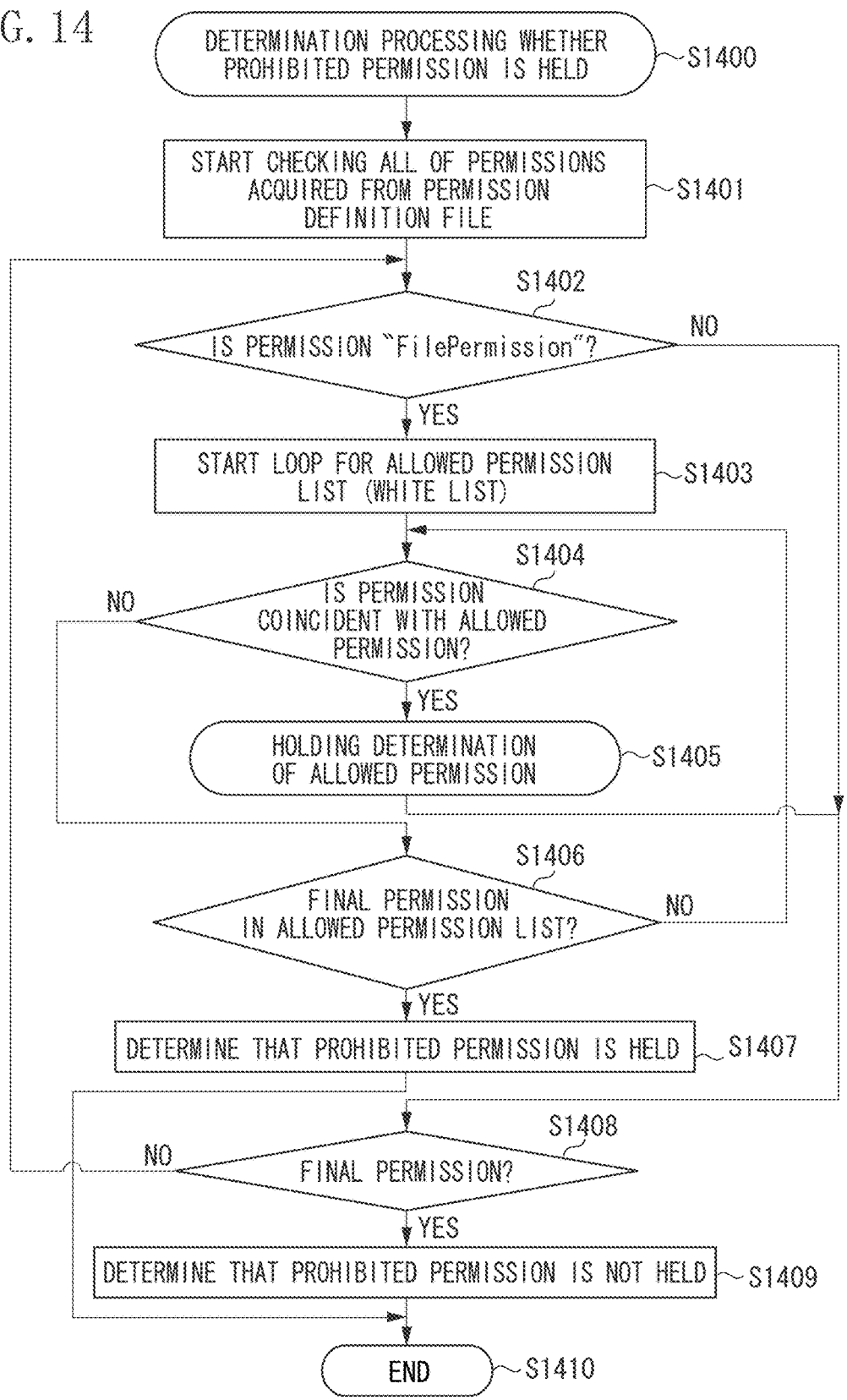
FIG. 14 is a flowchart when the OSGi extension unit performs prohibited permission holding determination for the prohibited permissions defined in the white list format.

FIG. 14 is a flowchart when the OSGi extension unit performs prohibited permission holding determination of the prohibited permissions defined in the white list format. The flowchart is one of the methods for determining whether the prohibited permission is held, illustrated in step S1004, and is considered to be performed continuously with the prohibited permission holding determination processing in the black list format illustrated in FIG. 11.

In step S1400, determination processing whether the permission held by the bundle is included in the prohibited permissions defined in the white list format is started.

In step S1401, checking all of the permissions held by the bundle is started. The following check is performed on all of the permissions held by the bundle.

In step S1402, it is determined whether the permission is "FilePermission" defined in the white list format. In a case where the permission is not "FilePermission" (NO in step S1402), the processing proceeds to step S1408. In a case where the permission is "FilePermission" (YES in step S1402), the processing proceeds to step S1403.

In step S1403, loop is started for all of the permissions that described in the prohibited permission list 1302 defined in the white list format.

In step S1404, it is determined whether "FilePermission" held by the bundle is coincident with any of all the permissions that are described in the prohibited permission list 1302 defined in the white list format. A specific method for determining coincidence is described in FIG. 15. In a case where it is determined as being coincident (YES in step S1404), the processing proceeds to step S1405. In step S1405, it is determined that the allowed permission is held, and the processing proceeds to step S1408.

In a case where it is determined as not being coincident in step S1404 (NO in step S1404), the processing proceeds to step S1406.

In step S1406, it is determined whether the permission is the final prohibited permission in the prohibited permission list 1302 defined in the white list format. In a case where unchecked permission exists (NO in step S1406), the processing returns to step S1404, and the determination processing for the other prohibited permission defined in the white list format is continuously repeated. In a case where all of the prohibited permissions are completely checked and the allowed "FilePermission" is not held, the processing proceeds to step S1407.

It is determined that the prohibited permission is held in step S1407, and the determination processing ends in step S1410. In this case, "YES" is returned as a determination result of step S1004.

In step S1408, it is determined whether the permission is a final permission held by the bundle. In a case where unchecked permission exists (NO in step S1408), the processing returns to step S1402, and the determination processing is continuously repeated for next permission held by the bundle. After all of the permissions held by the bundle are completely checked in the above-described manner, the processing proceeds to step S1409.

It is determined in step S1409 that the prohibited permission is not held, and the determination processing ends in step S1410. In this case, NO is returned as the determination result of step S1004.

FIG. 15 is a diagram to explain a method for determining whether the permission held by the bundle is included in the prohibited permissions in the white list format.

A case of a prohibited permission (1500) is described as an example 1. The prohibited permission (1500) is (java.io.FilePermission) as a permission. "/xxx/yyy/zzz/-" is specified as "name", and "read,write,delete" is specified as "action". The symbol "-" indicates all directories and files under the directory "/xxx/yyy/zzz/".

Assume that the permission held by the bundle is (java.io.FilePermission"<<ALL FILES" "read,write,delete") (1501). In this example, <<ALL FILES>> in "name" indicates that all of files are target. Thus, it is regarded that the permission includes a file path other than the allowed file path, and it is determined that the prohibited permission is held.

Furthermore, assume that the permission held by the bundle is (java.io.FilePermission"/xxx/yyy/zzz/-" "read,write,delete,execute") (1502). In such a case, both are coincident with each other in the permission and "name" but "execute" is out of allowable range as "action", and it is accordingly determined that the prohibited permission is held.

In a case where the permission held by the bundle is (java.io.FilePermission"/xxx/yyy/zzz/aaa.log" "write") (1503), all of the permission, "name", and "action" are considered within an allowable range. Thus, it is determined that the prohibited permission is not held.

Even in a case where the permission held by the bundle is (java.io.FilePermission"/xxx/yyy/zzz/www" "read, write") (1504), all of the permission, "name", and "action" are considered within an allowable range. Accordingly, it is determined that the prohibited permission is not held.

FIG. 14 is a flowchart to determine whether the bundle to be installed holds the prohibited permission; however, the determination method is merely an example. In other words, the determination may not be performed in accordance with the flowchart of FIG. 14, and it is sufficient to determine whether the permission of the permission definition file of the bundle to be installed includes the permission included in the prohibited permission list illustrated in FIG. 13. In a case where it is determined that the prohibited permission is not held, installation is executed.

The method described in the above-described exemplary embodiment makes it possible to achieve advantageous effects specifically described below.

A second modification of the first exemplary embodiment will be described below. In the second modification, a description will be provided of determination processing of the prohibited permissions that are defined in both of the black list format 801 illustrated in FIG. 8 of the first exemplary embodiment and the white list format 1301 illustrated in FIG. 13 of the first modification of the exemplary embodiment.

FIG. 16 is a flowchart when the OSGi extension unit 211 performs determination processing of the prohibited permissions that are defined in both of the black list format and the white list format.

The determination processing corresponds to determination in step S1004 of FIG. 10 that illustrates the entire flow of the installation.

In step S1600, determination processing whether the permission held by the bundle is included in the prohibited permissions is started.

In step S1601, checking all of the permissions held by the bundle with the prohibited permission in the black list format is started. The detail of the flowchart is as illustrated in FIG. 11. In a case where it is determined in step S1104 of FIG. 11 that the prohibited permission is held, coincidence is returned (YES in step S1602). The processing thus proceeds to step S1604. In a case where it is determined in step S1107 of FIG. 11 that the prohibited permission is not held, non-coincidence is returned (NO in step S1601). The processing thus proceeds to step S1602.

Subsequently, in step S1602, checking all of the permissions held by the bundle with the prohibited permissions defined in the white list format is started. The details of the flowchart are as illustrated in FIG. 14. In a case where it is determined in step S1407 of FIG. 14 that the prohibited permission is held, coincidence is returned (YES in step S1602). The processing thus proceeds to step S1604. In contrast, in a case where it is determined in step S1409 of FIG. 14 that the prohibited permission is not held, non-coincidence is returned (NO in step S1602). The processing thus proceeds to step S1603.

In step S1603, it is determined that the prohibited permission is not held in both of the black list format and the white list format, and "NO" is returned to step S1004.

In contrast, in step S1604, it is determined that the prohibited permission is held in one of the black list format and the white list format, and "YES" is returned to step S1004.

In step S1605, the determination processing of the prohibited permissions that are defined in both of the black list format and the white list format ends.

Making a method for creating the bundle available to the public as a software development kit (SDK) enables not only the company developing the image forming apparatus but also an external software vendor (hereinafter, referred to as third vendor) to develop a customized function of the image forming apparatus. Being able to develop the customized bundle may enable development of a bundle that adversely affects the image forming apparatus.

In a case where it is determined from the signature check state of the device that the bundle is under development, installation of the bundle holding the prohibited permission previously defined as a permission that may have adverse effects is not allowed. As a result, safety of the image forming apparatus in the SDK business is secured.

According to the exemplary embodiment described above, installation of an application including a permission that may extract information in the image forming apparatus is not allowed even under development, which secures safety of the image forming apparatus.

The exemplary embodiment described above produces advantageous effects of allowing installation of applications including the application under development while securing safety of the image forming apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-032444, filed Feb. 23, 2017, and No. 2017-221286, filed Nov. 16, 2017, which are hereby incorporated by reference herein in their entirety.

What is claimed is:

1. An image forming apparatus, comprising:
   a storage unit configured to store information that indicates whether the image forming apparatus is in a setting of checking a signature when an application is installed or not;
   a first determination unit configured to, using the information stored in the storage unit, determine whether the image forming apparatus is in the setting of checking a signature when an application is installed;
   an acquisition unit configured to acquire an application that is a target of installation; and
   a second determination unit configured to, using a signature of the application acquired by the acquisition unit, determine whether it is all right to install the application or not in a case where it is determined by the first determination unit that the image forming apparatus is in the setting of checking a signature when an application is installed, and configured to, using information regarding a permission included in the application acquired by the acquisition unit, determine whether it is all right to install the application or not in a case where it is determined by the first determination unit that the image forming apparatus is not in the setting of checking a signature when an application is installed.

2. The image forming apparatus according to claim 1, wherein the application includes a file defining a permission.

3. The image forming apparatus according to claim 1, further comprising:
   a switching unit configured to switch whether to set the image forming apparatus into the setting of checking a signature when an application is installed or not.

4. The image forming apparatus according to claim 3, further comprising:
   a receiving unit configured to receive, from an external device, information that indicates whether to set the image forming apparatus into the setting of checking a signature when an application is installed or not,
   wherein, based on the information received by the receiving unit, the switching unit switches whether to set the image forming apparatus into the setting of checking a signature when an application is installed or not.

5. The image forming apparatus according to claim 1,
   wherein the second determination unit determines, using the signature of the application without using the information regarding the permission included in the application, whether it is all right to install the application or not in a case where it is determined by the first determination unit that the image forming apparatus is in the setting of checking a signature when an application is installed, and
   wherein the second determination unit determines, using the information regarding the permission included in the application without using the signature of the application, whether it is all right to install the application or not in a case where it is determined by the first determination unit that the image forming apparatus is not in the setting of checking a signature when an application is installed.

6. A method for controlling an image forming apparatus, the method comprising:
   storing information that indicates whether the image forming apparatus is in a setting of checking a signature when an application is installed or not;
   determining, as a first determination using the information stored in the storing, whether the image forming apparatus is in the setting of checking a signature when an application is installed;
   acquiring an application that is a target of installation; and
   determining, as a second determination using a signature of the application acquired in the acquiring, whether it is all right to install the application or not in a case where it is determined in the first determination that the image forming apparatus is in the setting of checking a signature when an application is installed, and determining, using information regarding a permission included in the application acquired in the acquiring, whether it is all right to install the application or not in a case where it is determined in the first determination that the image forming apparatus is not in the setting of checking a signature when an application is installed.

7. The method for controlling the image forming apparatus according to claim 6, wherein the application includes a file defining a permission.

8. The method for controlling the image forming apparatus according to claim 6, further comprising:

switching whether to set the image forming apparatus into the setting of checking a signature when an application is installed or not.

9. The method for controlling the image forming apparatus according to claim 8, further comprising:

receiving, from an external device, information that indicates whether to set the image forming apparatus into the setting of checking a signature when an application is installed or not, wherein, in the switching, based on the information received in the receiving, it is switched whether to set the image forming apparatus into the setting of checking a signature when an application is installed or not.

10. The method for controlling the image forming apparatus according to claim 6, wherein, in the second determination, it is determined, using the signature of the application without using the information regarding the permission included in the application, whether it is all right to install the application or not in a case where it is determined in the first determination that the image forming apparatus is in the setting of checking a signature when an application is installed, and wherein, in the second determination, it is determined, using the information regarding the permission included in the application without using the signature of the application, whether it is all right to install the application or not in a case where it is determined in the first determination that the image forming apparatus is not in the setting of checking a signature when an application is installed.

11. A non-transitory computer readable medium storing a program, the program causing an application-executable computer to execute an information processing method, the information processing method comprising:

storing information that indicates whether the image forming apparatus is in a setting of checking a signature when an application is installed or not;

determining, as a first determination using the information stored in the storing, whether the image forming apparatus is in the setting of checking a signature when an application is installed;

acquiring an application that is a target of installation; and determining, as a second determination using a signature of the application acquired in the acquiring, whether it is all right to install the application or not in a case where it is determined in the first determination that the image forming apparatus is in the setting of checking a signature when an application is installed, and determining, using information regarding a permission included in the application acquired in the acquiring, whether it is all right to install the application or not in a case where it is determined in the first determination that the image forming apparatus is not in the setting of checking a signature when an application is installed.

12. The computer readable medium according to claim 11, wherein the application includes a file defining a permission.

* * * * *